US012758922B2

(12) United States Patent
Rahimalimamaghani et al.

(10) Patent No.: US 12,758,922 B2
(45) Date of Patent: Oct. 13, 2026

(54) CARBON MOLECULAR SIEVE MEMBRANE PREPARED FROM HYDROQUINONE AND THE METHOD OF MANUFACTURING

(71) Applicant: TECHNISCHE UNIVERSITEIT EINDHOVEN, Eindhoven (NL)

(72) Inventors: Arash Rahimalimamaghani, Eindhoven (NL); Fausto Gallucci, Eindhoven (NL); David Alfredo Pacheco Tanaka, Eindhoven (NL); Margot Anabell Llosa Tanco, Eindhoven (NL)

(73) Assignee: TECHNISCHE UNIVERSITEIT EINDHOVEN, Eindhoven (NL)

( * ) Notice: Subject to any disclaimer, the term of this patent is extended or adjusted under 35 U.S.C. 154(b) by 472 days.

(21) Appl. No.: 18/566,487

(22) PCT Filed: Jun. 7, 2022

(86) PCT No.: PCT/NL2022/050312
§ 371 (c)(1),
(2) Date: Dec. 1, 2023

(87) PCT Pub. No.: WO2022/255877
PCT Pub. Date: Dec. 8, 2022

(65) Prior Publication Data
US 2024/0261736 A1 Aug. 8, 2024

(30) Foreign Application Priority Data
Jun. 4, 2021 (NL) ...................................... 2028393

(51) Int. Cl.
*B01D 53/22* (2006.01)
*B01D 67/00* (2006.01)
(Continued)

(52) U.S. Cl.
CPC ....... *B01D 67/0067* (2013.01); *B01D 53/228* (2013.01); *B01D 67/0093* (2013.01);
(Continued)

(58) Field of Classification Search
CPC ............ B01D 67/0067; B01D 69/1213; B01D 69/108; B01D 53/228; B01D 67/0093;
(Continued)

(56) References Cited

U.S. PATENT DOCUMENTS

| | | | | |
|---|---|---|---|---|
| 9,890,397 B1 * | 2/2018 | Chakrabarti | .............. | C12P 7/00 |
| 2011/0172317 A1 * | 7/2011 | Lehmann | ............... | B01D 69/02 528/370 |

(Continued)

FOREIGN PATENT DOCUMENTS

| | | | | |
|---|---|---|---|---|
| CN | 108711518 B | 9/2020 | | |
| JP | 2007063081 A | 3/2007 | | |
| WO | WO-2023113597 A1 * | 6/2023 | ............. | C04B 41/87 |

OTHER PUBLICATIONS

Torres et al., "Review on the Preparation of Carbon Membranes Derived from Phenolic Resins for Gas Separation: From Petrochemical Precursors to Bioresources," Carbon, Elsevier, Oxford, GB, vol. 183, Jul. 2, 2021, 22 pages.

*Primary Examiner* — Anthony Shumate
(74) *Attorney, Agent, or Firm* — Suiter Swantz IP

(57) ABSTRACT

The present invention relates to a method for manufacturing a carbon membrane supported on a ceramic support. The present invention also relates to a carbon membrane prepared from hydroquinone on a ceramic tubular support and to the use of such a membrane. The present invention is focused on the preparation of carbon membranes from hydroquinone oligomer as a thermosetting precursor for gas
(Continued)

separation. In an example chemical post treatment of membranes is used for increasing the $H_2/CO_2$, $H_2/N_2$ and $CO_2/N_2$ selectivities.

16 Claims, 3 Drawing Sheets

(51) Int. Cl.

| | |
|---|---|
| ***B01D 69/02*** | (2006.01) |
| ***B01D 69/04*** | (2006.01) |
| ***B01D 69/10*** | (2006.01) |
| ***B01D 69/12*** | (2006.01) |
| ***B01D 71/02*** | (2006.01) |

(52) U.S. Cl.
CPC ............. *B01D 69/02* (2013.01); *B01D 69/04* (2013.01); *B01D 69/108* (2022.08); *B01D 69/1213* (2022.08); *B01D 71/021* (2013.01); *B01D 2256/16* (2013.01); *B01D 2256/22* (2013.01); *B01D 2257/102* (2013.01); *B01D 2257/504* (2013.01); *B01D 2258/025* (2013.01); *B01D 2258/0283* (2013.01); *B01D 2258/05* (2013.01); *B01D 2325/04* (2013.01); *B01D 2325/22* (2013.01)

(58) Field of Classification Search
CPC ...... B01D 69/02; B01D 69/04; B01D 71/021; B01D 2256/16; B01D 2256/22; B01D 2257/102; B01D 2257/504; B01D 2258/025; B01D 2258/0283; B01D 2258/05; B01D 2325/04; B01D 2325/22
See application file for complete search history.

(56) References Cited

U.S. PATENT DOCUMENTS

| | | | | |
|---|---|---|---|---|
| 2016/0175767 | A1 * | 6/2016 | Richter ............. | H01M 8/04156 95/52 |
| 2016/0376263 | A1 * | 12/2016 | Patron .................. | A61K 8/4973 514/784 |
| 2017/0087199 | A1 * | 3/2017 | Patron .................. | A61K 31/381 |
| 2017/0096418 | A1 * | 4/2017 | Patron ..................... | A23L 33/10 |
| 2018/0133659 | A1 * | 5/2018 | Bhave .................. | B01D 69/125 |
| 2018/0361326 | A1 * | 12/2018 | Kuwana ................. | B01D 71/64 |
| 2019/0366277 | A1 * | 12/2019 | Karunakaran .......... | C08L 33/20 |
| 2020/0391161 | A1 * | 12/2020 | Tanaka ................. | B01D 71/021 |
| 2021/0008504 | A1 * | 1/2021 | Bocquet .................. | C07B 63/00 |
| 2025/0144575 | A1 * | 5/2025 | Llosa Tanco ........... | C01B 3/503 |

* cited by examiner

CARBON MOLECULAR SIEVE MEMBRANE PREPARED FROM HYDROQUINONE AND THE METHOD OF MANUFACTURING

FIELD OF THE INVENTION

The present invention relates to a method for manufacturing carbon membranes supported on a ceramic support, wherein the membranes are used for the separation of gases.

BACKGROUND OF THE INVENTION

In recent years researchers intended to develop membrane-based separation technologies to acquire higher purities and less energy consumption compared to conventional methods such as cryogenic distillation and pressure swing adsorption. With membranes technology, high purity $H_2$ could be achieved while $CO_2$ is available at high purity for CCS or CCU purposes. Integration of membranes in a reactor, could shift the equilibrium limited reactions to increase the efficiency of the processes.

The necessity of mitigating $CO_2$ emissions in recent decades for controlling the global warming caused by greenhouse gases is inevitable. Shifting from fossil-based fuels to green energy sources is a must for a sustainable future. Hydrogen as a potential solution for energy storage-carrier and consumption in chemicals synthesis such as fertilizers, mainly produced via steam reforming. $H_2$ separation and purification from $CO_2$ is considered one of the energy intensive processes.

$H_2$ recovery from waste streams such as metal industries off gases, could decrease the demand for fresh $H_2$ and as a result a decrease of the carbon footprint of metal industries. Currently due to limitations of the traditional technologies in $H_2$ separation from waste streams, these gases are burned to recover the energy or just sent to flare system. $CO_2$ separation and purification from industries flue gasses such as power plants or refineries are considered one of the main challenges in recent years.

While polymeric membranes are considered as a mature technology in areas such as water purification via reverse osmosis, in gas separation processes, still it is in early stages. Polymeric membranes for $H_2/CO_2$ and $CO_2/N_2$ separations suffer from sorption of $CO_2$, enlarging the polymer structure (swelling). The swelling phenomena decreases the selectivity of polymeric membranes and their final performance. Inorganic membranes do not swell and are considered as a potential technology for $H_2/CO_2$ and $CO_2/N_2$ separations.

Disadvantages of traditional methods such as absorption, in energy usage and solvent loss, are preventing from them to be widely accepted in the industries. Therefore, novel methods are required to eliminate these obstacles and make it possible for $CO_2$ separation and purification to be implemented widely in industries processes.

In addition, polymeric membranes are limited in operational temperature and pressure ranges due to the $CO_2$ sorption in the structure and swelling of the polymer for high temperature and pressure applications such as membrane reactors for $H_2$ production.

Due to chemical limitations of polymeric membranes in terms of swelling and instability at high temperatures, the $H_2/CO_2$ and $CO_2/N_2$ separation carried out at lower temperatures and pressures. Crosslinking of polymers is a common method to decrease the swelling which has disadvantages such as decrease in permeability which would increase the required surface area of the membranes for the process.

Currently due to limitations of the membranes in gas separation processes, new high-performance membranes are required.

Palladium membranes in recent years are being studied intensively due to their $H_2$ unique permeation mechanism. Palladium membranes could reach almost infinite selectivity and high permeability in $H_2$ separation and purification processes. Palladium as a noble metal, has passed even gold price in recent years due to lack of supply and high demand in the market. Palladium membranes suffer from a phenomenon which is called embrittlement which happens in certain temperatures which can destroy the membrane. Also, hydrogen transport mechanism in palladium membranes will follow the square root of hydrogen concentration; this limits the enhance in hydrogen flow via increase in operational pressure difference between retentate and permeate streams to decrease the required surface area of the membrane for the separation process.

Carbon membranes as an inorganic membrane, are produced by carbonization of a thermosetting polymer in an inert atmosphere or vacuum. Carbon membranes with a molecular sieve and surface adsorption transport mechanisms could be considered as a potential gas separation solution in industries. Due to carbon structure and chemical stability, carbon membranes can perform at temperatures up to 500° C. and operational pressure difference, depending on the support, could be as high as 140 bar.

Due to physical limitations in self supported carbon membranes such as mechanical fragility, supported carbon membranes are used; producing an increase in physical stability of the membrane and enhances the permeation performance of membranes because of the possibility to decrease the thickness of the membrane to few micrometre ranges. The thickness of supported carbon membranes could be as low as 1 μm to enhance the flow through carbon membranes.

BRIEF SUMMARY OF THE INVENTION

An object of the present invention is to provide membranes that demonstrate a high selectivity for $H_2/CO_2$ and $H_2$ permeability, high selectivity for $H_2/N_2$ and $H_2$ permeability and/or a high selectivity for $CO_2/N_2$ and $CO_2$ permeability.

Another object of the present invention is to provide high temperature resistant membranes with performance test up to 470° C.

Another object of the present invention is to provide tubular supported membranes capable of high operational pressures up to 70 bar pressure difference between retentate and permeate.

STATEMENTS OF THE INVENTION

The present invention thus provides in a first aspect a method for manufacturing a carbon membrane supported on a ceramic support from hydroquinone, the method comprising the following steps:

a) synthesis of precursor oligomer by condensation of hydroquinone with formaldehyde in aqueous acidic media and heat;
b) preparation of a dipping solution in an organic solvent;
c) coating a ceramic support via dip coating solution made in step b);
d) drying and polymerization of the coated support's top layer in step c);
e) carbonization of the polymerized construction of d), and f) post treatment of the carbonized construction of e), and optionally g) repetition of step c) to f) for multilayer carbon membranes.

The present invention thus relates to separation of $H_2$ and $CO_2$ from gas mixtures via carbon membranes synthesized from a thermosetting polyhydroquinone precursor. The membrane is supported on a ceramic porous material via coating method. The membrane could operate at extremely high temperatures and high pressures. $H_2/CO_2$, $CO_2/N_2$ and $H_2/N_2$ ideal selectivities and permeabilities passes well beyond performance of current organic membranes such as Robeson's upper bound limit of polymeric membranes. High selectivity and permeability coupled with lower price compared to palladium membranes and high chemical and mechanical stability, will reduce the cost of $H_2$ separation and purification in capital and operational costs.

In an example the dipping solution comprises the precursor oligomer and formaldehyde and possible other permeation enhancing components for initiation the polymerization and adding functional groups to the polymer.

In an example step b) further comprises synthesis of co-polymer with ethylene diamine or composite polymer with aluminum acetylacetonate.

In an example of the present method step f) of post treatment comprises humidification and oxidation of the membrane top layer with a diluted oxygen concentration in a stream which is used to enhance the permeance of the carbon membrane with opening the pores via oxidation.

In an example of the present method the carbonization temperature according to step e) is in a range of 500-1200° C.

In an example of the present method several coating layers are applied on the ceramic support, wherein the number of layers is preferably in a range of 1-8, wherein the thickness of each layer is preferably in a range of 300 nm-20 μm.

In an example of the present method the hydroquinone co-polymer is prepared from hydroquinone oligomer in an organic solvent with the addition of reagents such as ethylenediamine, aluminium acetylacetonate and formaldehyde, or combinations thereof.

In an example of the present method for the preparation of the dipping solution, hydroquinone oligomers are used as the main precursor and mixed with at least one component chosen from the group of polyvinyl butyral (PVB), aluminium acetylacetonate and ethylene diamine, or combinations thereof.

In an example of the present method the porous ceramic support is chosen from the group of $Al_2O_3$, $ZrO_2$, MgO, zeolites, $TiO_2$, $SiO_2$, $CeO_2$, YSZ, porous transition metal oxides tubes, or combinations thereof.

The present invention also relates in a second aspect to a membrane on a ceramic tubular support, wherein the membrane comprises at least one layer of a hydroquinone derived carbon membrane.

The present invention also relates in a third aspect to the use of a membrane as discussed above or to a membrane obtained according to a method as discussed above in separation of $H_2$ and/or $CO_2$ from gas mixtures.

In an example the gas separation processes are chosen from the group of $H_2/CO_2$, $CO_2/N_2$ and $H_2/N_2$.

In an example the present membrane is used in $H_2$ separation and purification in $H_2$ production reactors.

In an example the present membrane is used in $H_2$ recovery from waste streams such as metal industries blast furnace off gas treatment and fertilizer production purge gas streams.

In an example the present membrane is used in $CO_2$ separation for carbon capture and storage (CCS) and/or in carbon capture and utilization (CCU) processes, such as separation of $CO_2$ from post combustion gas streams or bio syngas purification.

The present invention is focused on supported carbon membranes for $H_2/CO_2$, $H_2/N_2$ and $CO_2/N_2$ separation processes. Hydroquinone derived membranes on ceramic tubular supports with few micrometre thicknesses fabricated and the permselectivities tests are performed from 45° C. up to 470° C. and pressures differences up to 30 bar between the retentate and permeate. Fabrication parameters are tailored to reach high performance in each gas separation process in terms of permselectivities. Hydroquinone oligomers are used as the main precursor for carbon membrane and they are copolymerized with ethylene diamine for $CO_2/N_2$ and mixed with poly vinyl butyral (PVB) for $H_2/CO_2$ separation processes respectively. Moreover, carbon membranes are synthesized with aluminium acetylacetonate and hydroquinone oligomers to result a composite structure carbon membrane for $H_2/N_2$ separation. All three membranes are supported on tubular ceramic supports with average pore size of 100 nm for alpha alumina support and 120 nm for zirconia supports.

BRIEF DESCRIPTION OF THE DRAWINGS

The invention will now be described by the following non-limiting examples.

EXAMPLES

Examples

Figure 1:
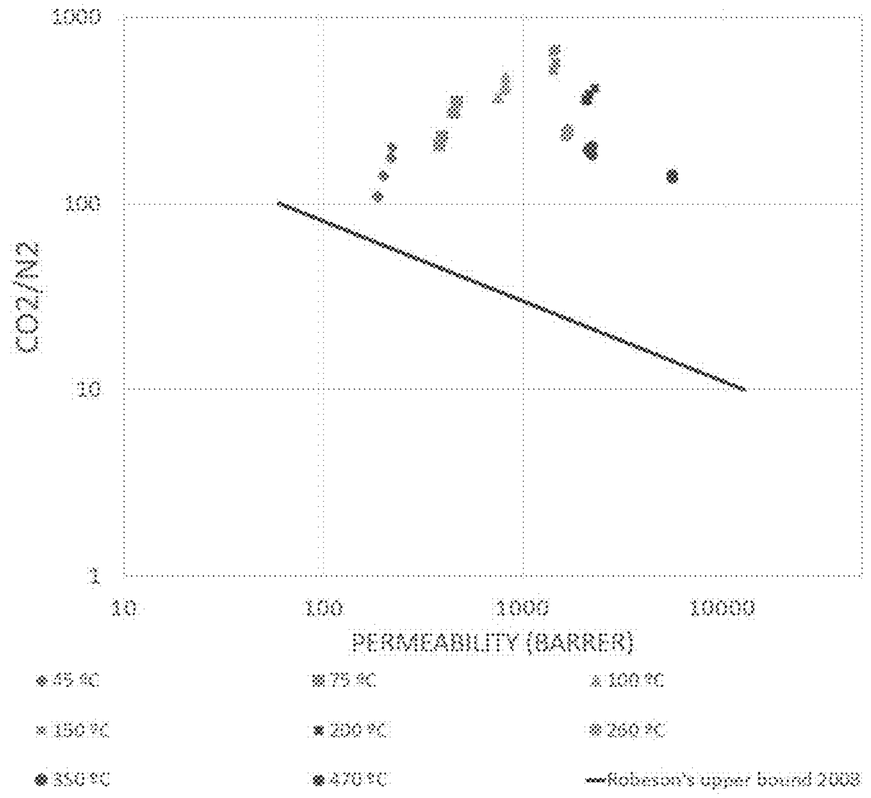
FIG. 1 indicates the permeability of membrane at multiple temperatures.

Table 1 summarizes the fabrication parameters in three developed membranes.

TABLE 1 fabrication parameters of hydroquinone derived tubular supported carbon membranes.

| Membrane for | $H_2/CO_2$ | $H_2/N_2$ | $CO_2/N_2$ |
|---|---|---|---|
| Support material | $Al_2O_3$ | $ZrO_2$ | $ZrO_2$ |
| Support average pore size | 100 nm | 120 nm | 120 nm |
| Precursor (s) | Hydroquinone, Polyvinyl butyral | Hydroquinone oligomer, Aluminium acetylacetonate | Hydroquinone oligomer, ethylene diamine |
| Number of selective layers (dippings) | 3 | 2 | 2 |
| Carbonization temperature | 500° C. | 600° C. | 500° C. |
| Carbonization atmosphere | Ar | $N_2$ | $N_2$ |
| Selective layer thickness | 4.3 μm | 6.7 μm | 3.8 μm |

An elemental analysis has been performed on the membranes. Results are summarized at Table 2.

TABLE 2 elemental analysis of hydroquinone derived carbon membranes wt %.

| Membrane | $H_2/CO_2$ | $H_2/N_2$ | $CO_2/N_2$ |
|---|---|---|---|
| N | 0 | 0 | 1.77 |
| C | 85.48 | 93.56 | 80.23 |
| H | 5.23 | 2.34 | 6.14 |
| O | 9.29 | 4.1 | 11.86 |

Example 1: $H_2/CO_2$ Selective Membrane $H_2/CO_2$ high selectivity required in steam reforming reactors to firstly shift the equilibrium to the product side by removing one of the products according to Le-Chatelier's principle and secondly to produce high purity $H_2$ at the permeate. Hydroquinone oligomer is used as a main precursor for synthesis of $H_2/CO_2$ selective membrane. Membrane consist of 3 ultra-thin layers, each one of the layers are optimized with fabrication parameters to have high selectivity and preserving high permeability while they stack up onto each other.

Results of permselectivities tests for $H_2/CO_2$ membrane are compared to upper bound limits of polymeric membranes. Most cited upper bound limit (Robeson, 2008) and three upper bounds according to operational temperatures (35, 100, 150 and 200° C.) from literature at 2020 indicating the superior performance of $H_2/CO_2$ selective hydroquinone derived membrane over the organic membranes in terms of both ideal selectivity and $H_2$ permeability at operational temperatures from 45° C. to 470° C. and operational pressures from 1 to 6 barg.

Hydroquinone membrane reached maximum ideal $H_2/CO_2$ selectivity of 43 at 1 bar and 350° C. with $H_2$ permeability of 12455 Barrer. Membrane chemical and physical stability were tested at 350° C. for a period of 380 hr. at 1 bar operational pressure.

Example 2: $CO_2/N_2$ Selective Membrane $CO_2$ separation from flue gas in industrial scale requires a minimum $CO_2/N_2$ selectivity of 70 and a minimum permeance of $3.3\times10^{-7}$ mol/(m$^2$·s·Pa) for being an economically feasible. In case of $CO_2/N_2$ selective hydroquinone derived carbon membrane, the requirement is validated, and the application of this membrane could have a critical role in industries for separation of $CO_2$ from flue gas streams such as in metals manufacturing, power plants, and bio refineries.

Membrane is fabricated on a tubular porous zirconia support with an average pore size of 120 nm. Two ultra-thin selective carbon layers are utilized to reach the desired permselectivities performances. This carbon membrane consist of two selective layers on each other. Upper layer with bigger pore sizes acts as adsorption sites while second layer with smaller average pore size prevents from diffusion of $N_2$ molecules.

Transport mechanism in the membrane follows surface diffusion mainly for $CO_2$. Membrane fabrication is based on condensation polymerization of the oligomer and carbonization at inert atmosphere. FIG. 1 indicates the permeability of membrane at multiple temperatures.

FIG. 1 indicates the higher performance of $CO_2/N_2$ selective hydroquinone derived carbon membrane compared to polymeric membranes in operating pressures from 1 to 6 barg and operational temperatures from 45° C. to 470° C.

$CO_2/N_2$ selective hydroquinone derived carbon membrane reached the maximum ideal selectivity of 680 at 150° C. and 2 bar pressure difference between permeate and retentate with $CO_2$ permeability of 1471 Barrer.

Example 3: $H_2/N_2$ Selective Membrane

Hydrogen recovery from waste streams in industries such as metal, bio refineries, fertilizers production etc. could increase the efficiency of the processes and reduce the consumption of fresh hydrogen which is mostly produced from fossil fuels and it contributed to greenhouse gas emissions.

Figure 2:
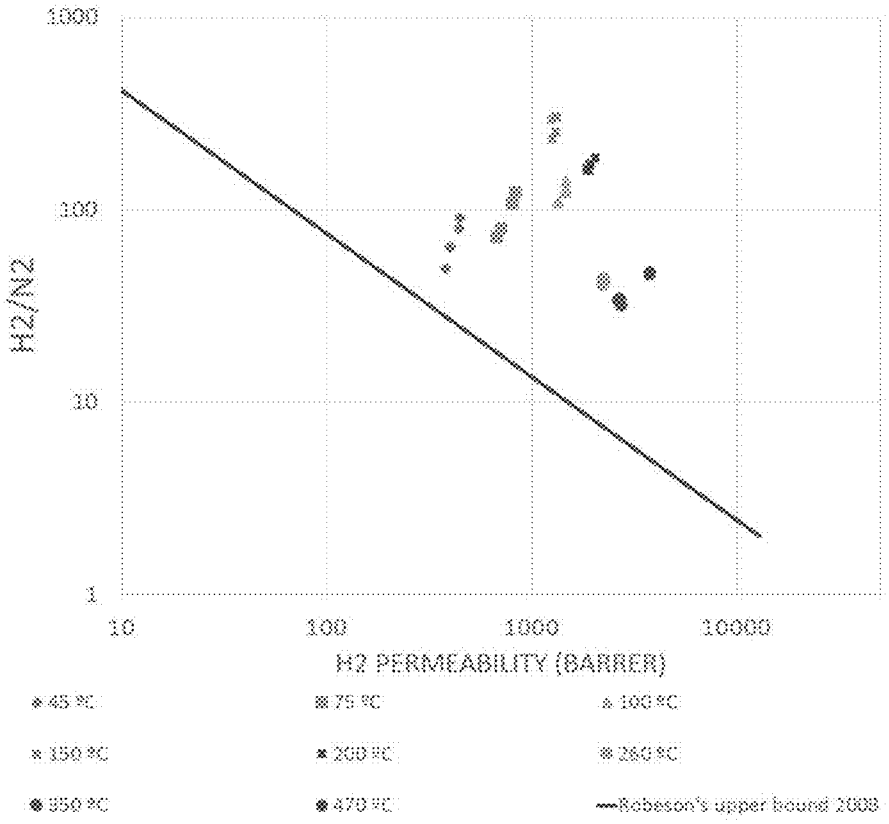
FIG. 2 represents the performance of membrane compared to literature upper bound limit for $H_2/N_2$ separation membranes.

$H_2/N_2$ selective hydroquinone derived carbon membrane with 2-layer structure is fabricated on a zirconia porous support with average pore size of 120 nm. Performance of the membrane is tested in temperatures from 45° C. to 470° C. and pressures from 1 bar to 6 bar. Membrane is carbonized at 600° C. in $N_2$ atmosphere. FIG. 2 represents the performance of membrane compared to literature upper bound limit for $H_2/N_2$ separation membranes.

Figure 3:
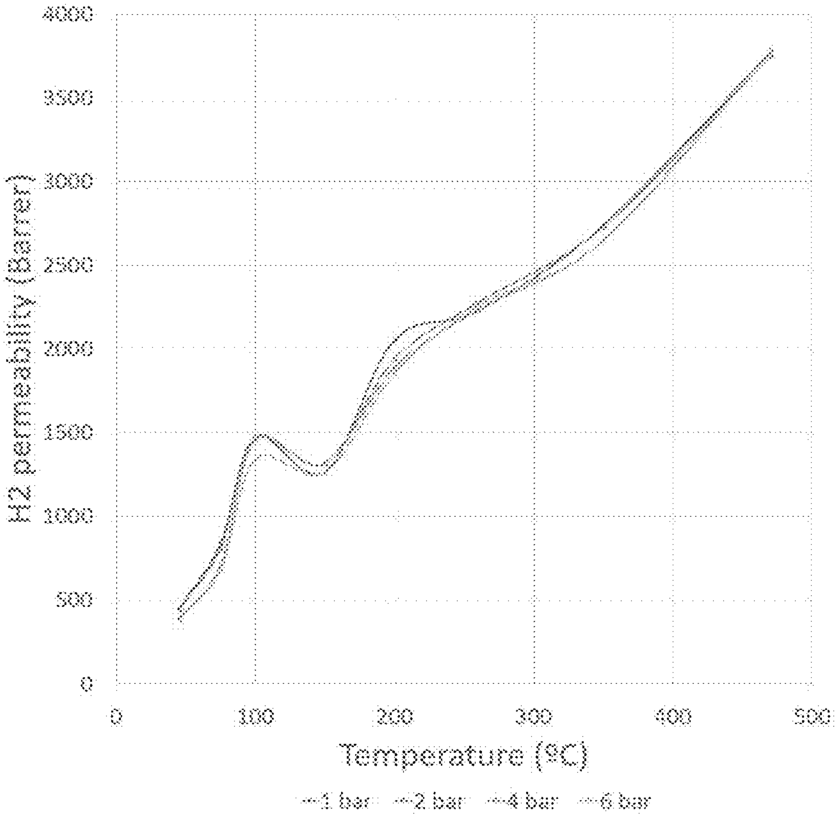
FIG. 3 represents the $H_2$ permeability at different operational pressures and temperatures. 8

$H_2/N_2$ selective membrane reached maximum ideal selectivity of 302 at 2 bar and 150° C. with hydrogen permeability of 1314 Barrer. FIG. 3 represents the $H_2$ permeability at different operational pressures and temperatures.

The invention claimed is:

1. A method for manufacturing a carbon membrane supported on a ceramic support from hydroquinone, the method comprising the steps of:

a) synthesizing a precursor oligomer by condensing hydroquinone with formaldehyde in aqueous acidic media and heat;

b) preparing a dipping solution in an organic solvent;

c) coating a ceramic support via dip coating solution obtained in step b);

d) drying and polymerizing a top layer of the coated ceramic support obtained in step c);

e) carbonizing the polymerized construction obtained in step d); and f) post treating the carbonized construction obtained in step e).

2. The method according to claim 1, further comprising, for multilayer carbon membranes, repeating steps c) to f).

3. The method according to claim 1, wherein the dipping solution comprises the precursor oligomer, formaldehyde, and at least one permeation enhancing component for initiating the polymerization and adding functional groups to the polymer.

4. The method according to claim 1, wherein step b) further comprises synthesizing co-polymer with ethylene diamine or composite polymer with aluminum acetylacetonate.

5. The method according to claim 1, wherein step f) comprises humidifying and oxidizing the carbon membrane with diluted oxygen stream.

6. The method according to claim 1, wherein in step e) the carbonizing temperature is in a range from 500° C. to 1200° C.

7. The method according to claim 1, wherein:

one or more layers of coating are applied on the ceramic support;

the number of layers is from 1 to 8 layers; and a thickness of each layer is from 300 nm to 20 μm.

8. The method according to claim 1, wherein the dipping solution in an organic solvent is prepared with reagents including at least one of ethylenediamine, aluminum acetylacetonate, and formaldehyde.

9. The method according to claim 8, wherein hydroquinone oligomers are used as the main precursor, which is mixed or copolymerized with at least one component selected from the group including at least one of polyvinyl butyral (PVB), aluminum acetylacetonate, and ethylene diamine.

10. The method according to claim 1, wherein the ceramic support is selected from the group including at least one of $Al_2O_3$, $ZrO_2$, $TiO_2$, MgO, zeolites, $SiO_2$, $CeO_2$, and YSZ porous transition metal oxide tubes.

11. The method according to claim 1, further comprising the step of:

g) separating, using the carbon membrane obtained in step f), at least one of $H_2$ and $CO_2$ from gas mixtures.

12. The method according to claim 11, wherein the separating process of step g) includes at least one of $H_2/CO_2$, $CO_2/N_2$, and $H_2/N_2$.

13. The method according to claim 11, wherein the separating step g) is used in $H_2$ separation and purification in $H_2$ production reactors.

14. The method according to claim 11, wherein the separating step g) is used in $H_2$ recovery from waste streams associated with metal industry blast furnace off gas treatment and fertilizer production purge.

15. The method according to claim 11, wherein the separating step g) is used in $CO_2$ separation for at least one of carbon capture and storage, and carbon capture and utilization processes including separating $CO_2$ from post combustion gas streams or bio syngas purification.

16. The method according to claim 11, further comprising the step of providing the carbon membrane obtained in step f) on a ceramic tubular support.

* * * * *